(12) United States Patent
Ranganathan (10) Patent No.: US 7,734,474 B2
(45) Date of Patent: Jun. 8, 2010

(54) DISPLAY CONFIGURATION

(75) Inventor: Parthasarathy Ranganathan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1668 days.

(21) Appl. No.: 10/830,218

(22) Filed: Apr. 23, 2004

(65) Prior Publication Data

US 2005/0240538 A1    Oct. 27, 2005

(51) Int. Cl.
*G06Q 99/00* (2006.01)
(52) U.S. Cl. .............................. 705/1.1; 705/7; 705/10; 705/14; 705/400; 345/207; 345/690
(58) Field of Classification Search ............... 705/1, 705/10, 80, 5, 7, 14.53, 400, 14; 345/83, 345/694, 1.1, 207, 690
See application file for complete search history.

(56) References Cited

U.S. PATENT DOCUMENTS

| | | | |
|---|---|---|---|
| 5,598,565 A * | 1/1997 | Reinhardt | 713/323 |
| 5,936,608 A * | 8/1999 | Springer | 345/690 |
| 6,456,016 B1 | 9/2002 | Sundahl et al. | |
| 7,036,025 B2 * | 4/2006 | Hunter | 713/300 |
| 7,333,080 B2 * | 2/2008 | Miller et al. | 345/83 |
| 2002/0138744 A1 * | 9/2002 | Schleicher et al. | 713/187 |
| 2003/0043137 A1 * | 3/2003 | Nakamura | 345/207 |
| 2003/0055739 A1 * | 3/2003 | Takaba et al. | 705/26 |
| 2003/0090515 A1 * | 5/2003 | Chang et al. | 345/745 |
| 2003/0126013 A1 * | 7/2003 | Shand | 705/14 |
| 2003/0135288 A1 | 7/2003 | Ranganathan et al. | |
| 2003/0156074 A1 * | 8/2003 | Ranganathan et al. | 345/1.1 |
| 2004/0113875 A1 * | 6/2004 | Miller et al. | 345/82 |
| 2004/0117242 A1 * | 6/2004 | Conrad et al. | 705/11 |
| 2004/0267600 A1 * | 12/2004 | Horvitz | 705/10 |
| 2005/0004842 A1 * | 1/2005 | Mammen | 705/14 |

FOREIGN PATENT DOCUMENTS

WO    WO 9904562 A1 *  1/1999

OTHER PUBLICATIONS

Stafford-Fraser et al. , "BrightBoard: A Video-Augmented Environment",Apr. 13-18, 1996; Proceedings of CHI '96, Human Factors in Computing Systems, Vancouver, Canada, 9 pgs.*

Bloom, L. et al., "Investigating the Relationship Between Battery Life and User Acceptance of Dynamic, Energy-Aware Interfaces on Handhelds", Hewlett Packard Technical Report, Downloaded from the Internet on Apr. 22, 2004.

Choi, I. et al., "Low-Power Color TFT LCD Display for Hand-Held Embedded Systems", Aug. 2002.

Draffan, EA. et al., "Colour and Contrast Accessibility Issues: For the Design of E-Learning Materials", May 2003.

(Continued)

*Primary Examiner*—John W Hayes
*Assistant Examiner*—Freda A Nelson (57) ABSTRACT

A display configuration associated with displaying information from at least one source is determined using a cost metric. The cost metric is associated with a cost of displaying information from the source.

21 Claims, 6 Drawing Sheets

OTHER PUBLICATIONS eTForecasts, "Worldwide PDA & Smartphone Forecast 1998-2008", Jun. 2003.

Flinn, J. et al., "Energy-Aware Adaptation for Mobile Application", 1999.

Geelhoed, E et al., "Energy-Aware User Interfaces and Energy-Adaptive Displays: Improving Battery Lifetimes in Mobile Devices", Proceedings of HP TechCon, Jun. 2004; Downloaded from the Internet on Apr. 22, 2004.

Harter, T. et al., "Energy-Aware User Interfaces: An Evaluation of User Acceptance", Proceedings of the Annual Conference on Human Factors in Computing Systems, 2004; Downloaded from the Internet on Apr. 22, 2004.

Harter, T. et al., "The Potential for Energy-Aware User Interfaces on Handheld Devices", Nov. 2003.

Iyer, S. et al., "Energy-Aware Display System Designs for Future Mobile Environments", ACM Press, 2003.

Kamijoh, N. et al., "Energy Trade-Offs in the IBM Wristwatch Computer", IBM Research Division, Oct. 2001. Abstract.

Pering, T. et al., "The Simulation and Evaluation of Dynamic Voltage Scaling Algorithms", ACM ISBN Aug. 2000.

Richardson, T. et al., "Virtual Network Computing", IEEE Internet Computing, Jan./Feb. 1998.

Udani, S. et al., "The Power Broker: Intelligent Power Management for Mobile Computer", Dept of Computer Information Science, University of Pennslyvania, 1996.

Viredaz, M. et al., "Energy Management on Hanheld Devices", ACM Press, 2003.

Viredaz, M. et al., "Power Evaluation of a Handheld Computer", IEEE Micro, 2003.

Xiong, S. et al., "A Simple and Flexible Driver for OLED", ASID, 1999. Abstract.

* cited by examiner

```
        FLIGHT  ARRIVAL
          214    12:22
          128     1:00
          242     1:25
          618     1:30
```

```
        FLIGHT  ARRIVAL
          214    12:22
          128     1:00
          242     1:25
          618     1:30
```

DISPLAY CONFIGURATION

TECHNICAL FIELD

This invention relates generally to displaying information. More particularly, the invention relates to determining a display configuration for displaying information.

BACKGROUND

Computer systems are increasingly being designed in the context of a world where computing is ubiquitous. Computer systems are becoming smaller, cheaper, and more powerful. In an effort to reduce costs and reduce size of computer systems, displays provided with these computer systems may not completely satisfy a user. For example, the displays may be too small to efficiently perform word processing on a document or read a stored document.

SUMMARY OF THE EMBODIMENTS

According to an embodiment, a display configuration associated with displaying information from at least one source is determined using a cost metric.

According to another embodiment, a plurality of display configurations are determined using at least a cost metric and each configuration is evaluated based at least on the cost metric. A display configuration is selected based on the evaluation.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF THE EMBODIMENTS

For simplicity and illustrative purposes, the principles of the embodiments are described. Moreover, in the following detailed description, references are made to the accompanying figures, which illustrate specific embodiments. Electrical, mechanical, logical and structural changes may be made to the embodiments without departing from the spirit and scope of the embodiments.

According to an embodiment, a system is provided that is operable to receive information from one or more sources and display the information in a variety of configurations. A particular configuration may be selected based on one or more metrics. Examples of the metrics include cost metrics, display lifetime metrics, power consumption metrics, and usage metrics. In one embodiment, the system includes a display that may be used by a plurality of computer systems for a fee. A cost metric associated with a cost of using the display and/or a cost of operating the display is determined. Based on the cost metric and possibly other metrics, a particular display configuration is selected for displaying the information from one or more of the computer systems.

Figure 1:
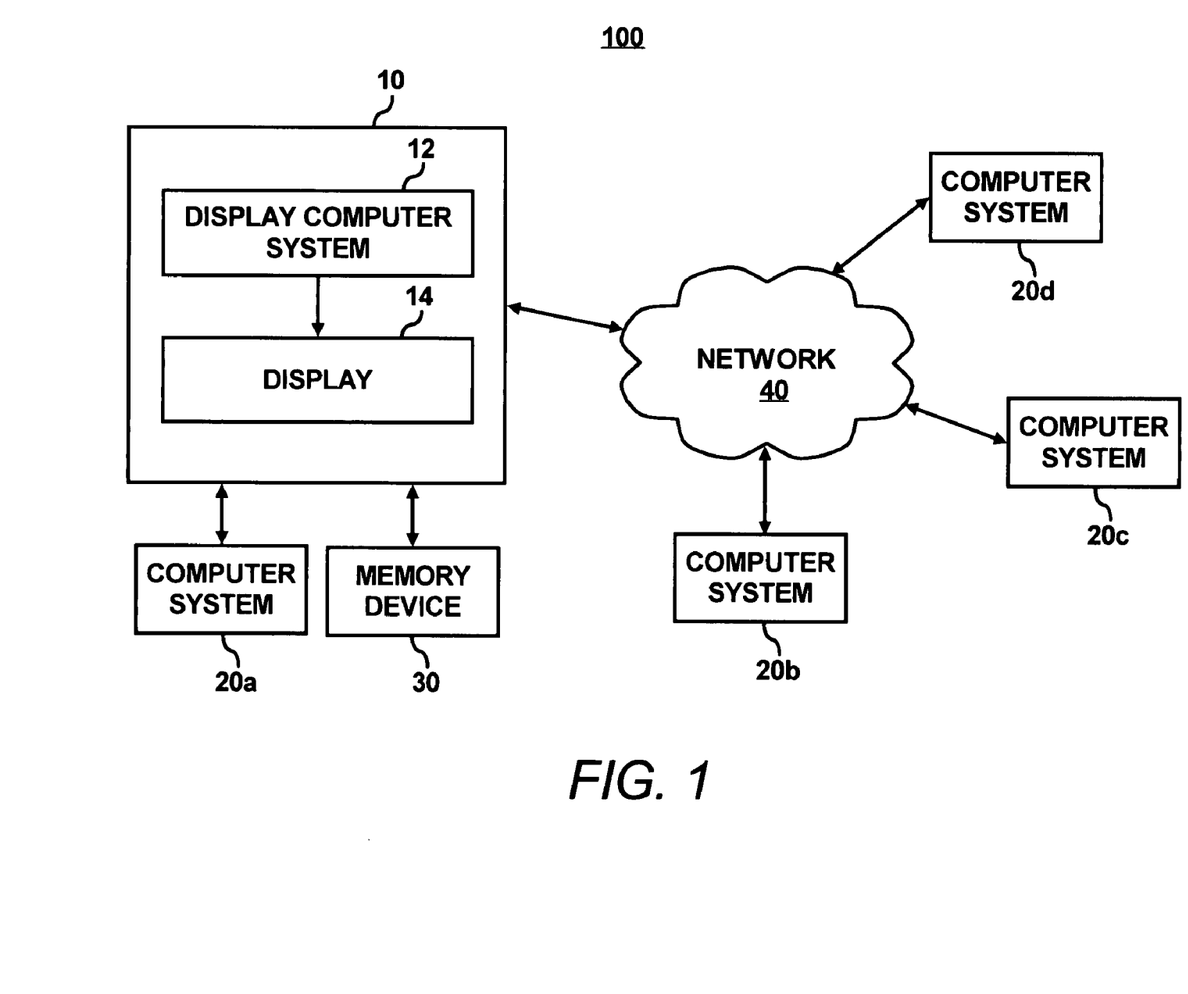
FIG. 1 illustrates a block diagram of a system, according to an embodiment.

FIG. 1 illustrates an embodiment of a system 100 including a display real estate control system (DREC) 10. The DREC 10 may include a display computer system 12 and a display 14. The display 14 may be incorporated with the display computer system 12 as a single device or attached to the display computer system 12 as a separate unit. The computer systems 20 transmit information to the DREC 10 for display on the display 14 in the DREC 10. The display computer system 12 controls the display configuration, which is the visual representation of the information received from the computer systems 20 that is displayed on the display 14. The display computer system 12 may evaluate one or more factors, such as power consumption metrics, lifetime metrics, cost metrics, user display settings, etc., when determining the display configuration. In one embodiment, the DREC 10 operates as a community display system and is operable to display information from a plurality of the computer systems 20 simultaneously. The factors are evaluated to determine, for example, the size of a portion of the display 20 allocated to each of the computer systems 20 having information displayed on the display 20 and cost of displaying information using the DREC 10. In another embodiment, the DREC 10 displays information from a single one of the computer systems 20 at any particular time, and evaluates the factors to determine, for example, the size and cost of using the DREC 10 to display information. The DREC 10 may include modes, such that the DREC 10 can function as both a display operable to display information from multiple computer systems simultaneously or display information from one computer system. Also, the DREC 10, when operable to display information from multiple computer systems simultaneously, may only display information from one computer system as determined by the display computer system 12. For example, if information is only available from the computer system 20a, then that information is displayed on the display 14.

The display 14 is broadly defined to include any combination of software and hardware associated with the visual representation of data. For example, the display 14 may include a display panel, display controller, and drivers. Various types of display technologies may be used, such as cathode ray tube, liquid crystal display, digital light projection, plasma, organic light emitting diodes (OLEDs), etc. In one example, the display hardware supports control of portions of the display. For example, the hardware may include OLEDs, tiled displays, or multiple displays. OLEDs allow pixels or sub-pixels to be individually controlled, while tiled displays allow control over groups of pixels. The display computer system 12 may control portions of the display 14 to change a display configuration. With OLEDs, this may include individual control of sub-pixels, pixels or a group of pixels, such as controlling, intensity, color, refresh rate, etc. Also, the display computer system 12 may shift images on the display 14 to generate different display configurations.

The computer systems 20 may include substantially any type of device that is operable to transmit information to the DREC 10. Examples of the computer systems 20 may include laptops, personal computers, servers, personal digital assistants (PDAs), cellular phones, small computer systems such as pen computers, keychain computers, or watch computers, etc. The computer systems 20 may be connected to the DREC 10 directly or through the network 40. The network 40 may include a local area network (LAN) and/or a wide area network (WAN). The network 40 may include wired and/or wireless networks. For example, using a wireless LAN 40, the computer system 20b, which may include a PDA, laptop or other mobile device with a wireless network connection, connects to the network 40 to transmit information to the DREC 10 to be displayed on the display 14. Also, servers connected through the Internet may be connected to the DREC 10. For example, the computer system 20d includes a server and transmits information, such as advertisements, to the DREC 10 to be displayed on the display 14. In another example, the DREC 10 is provided in an airport, and the computer system 20c comprises a server located at the airport connected to the DREC 10 via a LAN and/or a WAN. The computer system 20c may display flight information, a map of the airport, streaming video describing security check-in procedure, etc. It will be apparent to one of ordinary skill that the DREC 10 may display substantially any type of information and can be located in variety of environments and settings.

The computer systems 20 may be connected to the DREC 10 without using the network 40. For example, the computer system 20a may be connected to the DREC 10 through a port, such as a USB or serial port, and may use a wired or a wireless connection, such as an infra-red or radio frequency connection. In addition, the DREC 10 may receive information from a memory device 30, such as a floppy disk, CD-ROM, memory card, etc.

Figure 2:
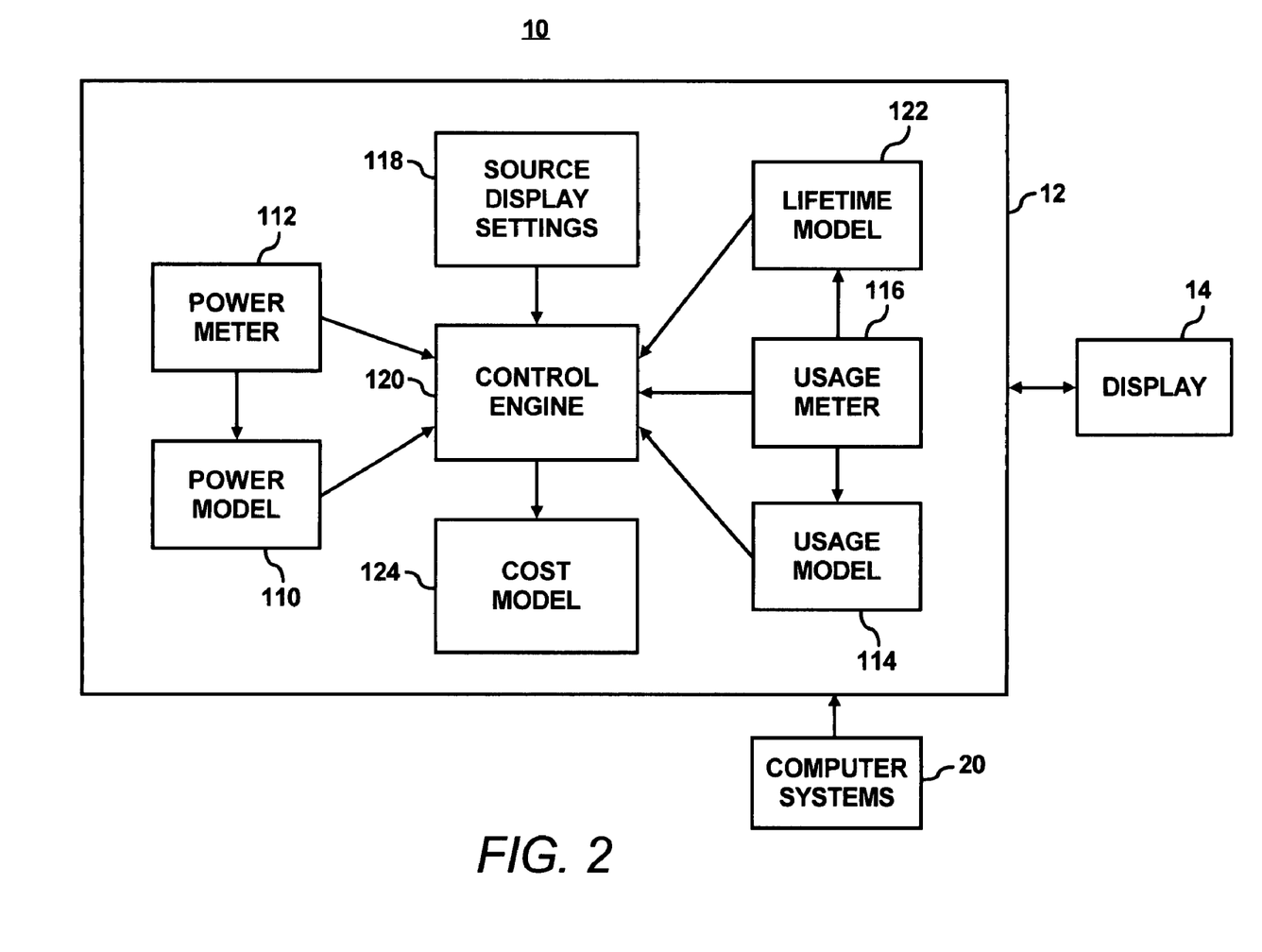
FIG. 2 illustrates a block diagram of a display real estate control system, according to an embodiment.

FIG. 2 illustrates an embodiment of the DREC 10. The DREC 10 includes a power model 110, a power meter 112, a usage model 114, a usage meter 116, lifetime model 122, cost model 124, source display settings 118, and a control engine 120. The DREC 10 may be implemented in hardware, software or a combination thereof as would readily be implemented by one of ordinary skill in the art. For example, the control engine 120 and/or other components of the DREC 10 may be implemented in software at the operating system level or windowing environment level that controls the configuration of the display 14. Alternate embodiments implement the DREC 10 in hardware or at the firmware or application layers.

The control engine 120 considers one or more factors, such as power consumption metrics, lifetime metrics, cost metrics, user display settings, etc., when determining a display configuration. These factors are determined using the components of the DREC 10. The power model 110 can be used to determine a power consumption metric related to the power consumption of the display 14. Power consumption as used herein can include specific power metrics such as average power or peak power or broader power metrics such as power multiplied by execution time (e.g., energy). Examples of the power consumption metric may include an estimate of the power consumption of the display 14, such as in terms of average power, peak power, and energy, and/or an estimate of the future power consumption of the display 14. A prediction of future power consumption may be based on the current use of the display 14 and/or a determination of the typical use of the display 14. Other power consumption metrics may be associated with power savings associated with displaying information on the display 14 using different configurations. For example, a power consumption metric is determined based on a first display configuration, and the power consumption metric is determined for a second display configuration, such as displaying the information using different colors, moving images on the display 14, dimming some or all of the display 14, etc. Other examples of power consumption metrics may include power consumption of the display computer system 12, and estimated future power consumption of the display computer system 12.

The power model 110 may be generated by profiling power consumption of the display 14 and/or one or more similar displays. Profiling may include a historical analysis of power consumption data for the display 14 and/or one or more similar displays. Power consumption data, which may include measured power consumption, can be captured over a period of time for the display 14 or for one or more similar displays. The power consumption data, for example, can be obtained during a study of the power consumption and use of one or more displays, which may be similar to or include the display 14. Also, the power meter 112 may measure power consumption for the display 14, which may be included in the power consumption data. The power consumption data can be used to generate the power model 110 and as input to the power model 110 to determine a power consumption metric. The power model 110 may include a statistical analysis or other calculations performed on the power consumption data for the display 14 to determine the power consumption metric, such as estimated power consumption or estimated future power consumption for the display 14.

The power meter 112 determines the power consumption of the display 14 and the display computer system 12. For example, the power meter 112 may measure current and voltage to determine power consumption of the display 14 and the display computer system 12. The power metering can be performed at the overall computer system level or at the individual subcomponent level. The output of the power meter 112 may be provided to the power model 110 and the control engine 120. The power model 110 may use the determined power consumption as power consumption data for determining a power consumption metric. The control engine 120 may use the determined power consumption to estimate operation costs for the display 14.

The usage model 114 can be used to determine a usage metric for the display 14. A usage metric is a metric associated with displaying information on the display 14, such as the amount of use of the display 14, estimated area of focus for the display 14, user preferences for viewing displayed information, estimated future use, etc. By profiling the use of the display 14 or one or more similar displays, the usage model 114 captures the typical usage behaviors of the display 14, and the usage behaviors are evaluated to identify usage patterns of the display 14. From the usage patterns, the content and intent of the use of the display 14 may be determined. The usage model 114 may include a historical analysis of the use of the display 14 and/or one or more similar displays. The usage model 114 can be used to categorize the inefficiencies of the historical use of the display 14 and to determine different configurations for displaying information. The historical analysis can examine the use of a display by a particular user, by a class of users, and/or by general use not categorized by class. The historical analysis may include an analysis of the display captured offline, such as during a study of the use of the display, and/or online, such as the use of the display 14 by a particular user or computer system of the computer systems 20. U.S. patent application Ser. No. 10/033,738, entitled "Software-Directed Energy-Aware Control Of Display" by Ranganathan et al., which is incorporated by reference in its entirety, discloses conducting an analysis of the usage of a display to determine an area of focus.

The usage model 114 may include a statistical analysis and other calculations performed on usage data including the usage patterns to determine a usage metric. For example, usage patterns of the display 14 or one or more similar displays may be analyzed for a plurality of users. The output of the usage model 114 may include a table summarizing usage patterns, such as the average sizes of windows utilized by a user of the display, a histogram of colors used by a typical user, and a typical area of focus on the display. Based on the output of the usage model 114, the control engine 120 may increase the cost of displaying an image in the area of focus, charge less for images displayed outside the area of focus, and/or change colors or dim an image to reduce power consumption and operational costs of the display 14 and increase the remaining life of the display 14.

The usage meter 116 captures the current usage of the display 14 by individual users during periods of time and predicts how the usage pattern is likely to change. For example, the usage meter 116 stores the length of time and position of a window or image being displayed. The output of the usage meter 116 may be provided to the usage model 114 and the control engine 120. For example, the usage model 114 may utilize the data captured by the usage meter 116 to determine usage patterns. Also, the control engine 120 may utilize the output of the usage meter 116 to determine the cost of using the display 14 and operational costs. Data captured by the usage meter 116 may also be used by the lifetime model 122 to determine a lifetime metric.

The lifetime model 122 can be used to determine a lifetime metric for the display 14. The lifetime metric may include a metric associated with the lifetime of the display 14. Examples of the lifetime metric may include an estimate of past use and a prediction of future use of the display 14. A prediction of future use may be based on the current use of the display 14 and/or a determination of the typical use of the display 14. The lifetime metric may also be associated with the past use and predicted remaining life for groups of pixels, one or more pixels or sub-pixels (e.g., each red, green, and blue component of each pixel).

Past use of the display 14 may be determined by measurement or may be estimated. The usage meter 116 may be used to measure use parameters of the display 14, such as intensity of each sub-pixel, length of use, etc. In one example, current or light output is measured to determine past use of each sub-pixel. Also, an approximation may be used to estimate past use of a group of pixels based on measured parameters for a subset of pixels or sub-pixels. The measured usage data is input into a mathematical model to determine the past use and estimate the remaining life of pixels or sub-pixels. Also, an estimate of past use may be based on typical use of the display 14 and the length of operation of the display 14. Measured or estimated usage data may be input into the mathematical model to determine a lifetime metric, such as an estimate of past use and a prediction of remaining life for pixels in the display 14. The mathematical model may be determined using parameters experimentally derived from testing the lifetime of similar displays. For example, the mathematical model may be determined based on a historical analysis of lifetime data, such as decrease in pixel or sub-pixel intensity over time, etc. Also, display degradation curves provided by manufacturers may be used to estimate remaining life of a pixel or an entire display. For example, the mathematical model may include degradation curves for sub-pixels. Based on the measured or estimated past use (e.g., number of hours of use), the remaining life of a sub-pixel is determined using the degradation curve.

In one embodiment, estimates of past use, measured values associated with past use, estimates of remaining life for pixels may be stored in hardware or software registers for each pixel of the display. Periodically, or as required by the lifetime model 122, these values may be updated. In another embodiment, an approximation of pixel use is determined for regions of the display 14 larger than a single pixel, such as a group of pixels. Thus, fewer computations for determining past use and remaining life of pixels are needed, and less memory is needed to store lifetime metrics.

Another component of the display computer system 12 is the source display settings 118. These are display settings for the display 14 that are required for displaying information from a particular source, such as for each of the computer systems 20. Examples of the source display settings 118 may include displaying an image on the display 14 in one or more specified colors, size of the image, and location of the image. For example, the computer system 20a shown in FIG. 1 transmits information, such as a company logo, and source display settings 118 to the DREC 10. The source display settings 118 specify that the logo must be displayed in blue and gold. Thus, the control engine 120 may not modify the colors of the logo, even if modifying the colors results in reduced power consumption and increased remaining life for the display 14.

Another component of the display computer system 12 is the cost model 124. The cost model 124 determines a cost metric associated with using and/or operating the display 14. A cost metric associated with using the display 14 may include a monetary cost based on the size of an image to be displayed and the length of time the image is to be displayed. For example, screen area of the display 14 can be rented at 50 cents per 1024 pixels per hour. Screen area is the area used to display information on the display 14. Other factors may also be used to determine the monetary cost of using the display 14. For example, cost may be computed as the output of a function that factors the size of the image, the length of time the display 14 is used to display an image, the power consumption of displaying an image, the impact on lifetime of the display 14, and may also adapt for different times of the day. For example, with OLED displays, the power consumption of the display is dependent on the colors of the image being displayed. Green sub-pixels generally consume lower power than red sub-pixels, and thus an image using more green sub-pixels may require less power to be displayed and a user may be charged less. Similarly, the lifetime of one display color, e.g., red sub-pixels, may be shorter than that of another display color, e.g., green sub-pixels, and thus images that require more red sub-pixels have a more detrimental affect on display lifetime and can cost more to be displayed. Similarly, the cost associated with the using the display 14 during peak traffic times may be different from the cost associated with using the display 14 during less busy times. Instead of a pre-determined cost function, the cost metric can be approximated from extrapolations of data from monitoring the billing associated with various display usages at various times.

The cost model 124 may also be used to determine an operating cost for the display 14 and the cost of using the display 14 may be determined from the operating cost. For example, similarly to the cost of using the display 14, an operating cost may be determined as the output of a function that factors one or more of the size of the image, the length of time the display 14 is used to display an image, the power consumption of displaying an image, the impact on lifetime of the display 14, and may also adapt for different times of the day. Then, the cost of using the display 14 may be determined as a function of the operating cost, such as a predetermined percentage increase.

In one example, the cost model 124 may include a historical analysis of factors such as size of a displayed image, the length of time of displaying an image, the power consumption of displaying an image, the impact on lifetime of the display 14, display times, etc., and an analysis of how these factors relate to monetary costs for a display. Based on the historical analysis, each of these factors may be estimated for an image from a source to be displayed on the display 14. Based on these estimations, a cost metric, such as cost of using the display 14 or operating cost of displaying the image, is determined.

The control engine 120 determines one or more display configurations for displaying information received from one or more sources, such as one or more of the computer systems 20. A source may also include a user inputting information into the DREC 10 using an I/O device (not shown), such as a keyboard, mouse, etc. For example, the control engine 120 receives information to be displayed on the display 14 from a source, such as the computer system 20a shown in FIG. 1. Along with the information, the computer system 20a may send source display settings 118 for displaying the information. The source display settings 118 may include one or more of the size of the image including the information to be displayed, the length of time the image is to be displayed, the time of day for displaying the image, the position on the display 14 for displaying the image, whether the image may be modified such as by changing color or dimming the image, etc. Some of the display settings 118 may be determined by the control engine 120. For example, if the information from the computer system 20a includes a bitmap, then the size may be determined by the control engine 120. However, the size of the image may be changed if the source display settings 118 specify that the size of the bitmap may be reduced or increased. Also, these are examples of the source display settings 118. The source display settings may include one or more of these settings and may include different settings.

The control engine 120 utilizes at least one of the power model 110, the lifetime model 122, the usage model 114, the cost model 124, and the source display settings 118 to determine display configurations for displaying the information from the computer systems 20. The control engine 120 determines metrics such as operation costs, power consumption which may result in lower operational costs, impact on lifetime of the display 14, user acceptance, etc., using the models for each display configuration. Using an algorithm, which may weight the different metrics, such as cost metrics, power consumption metrics, lifetime metrics, and usage metrics, the control engine 120 selects one of the display configurations for displaying the information from the computer systems 20.

Figure 3A:
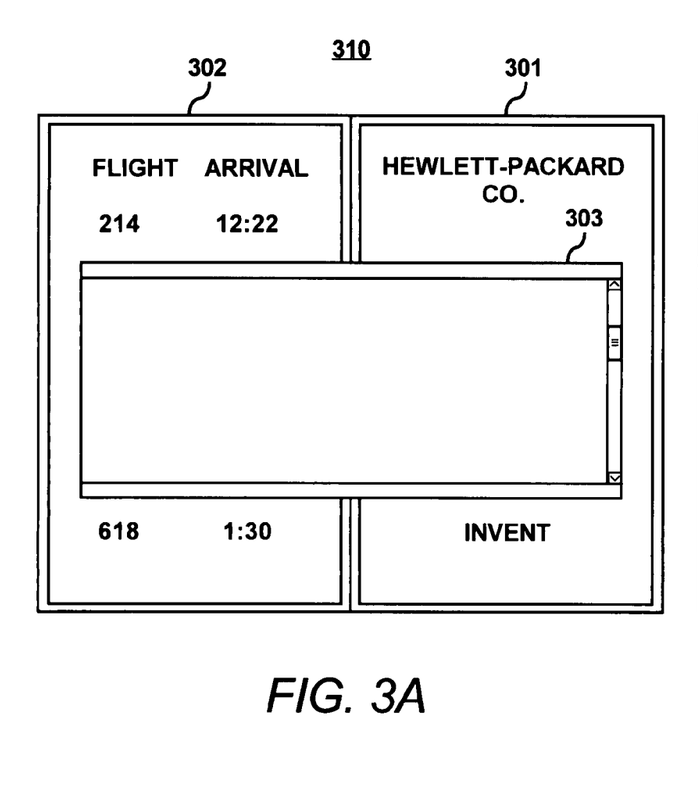
FIGS. 3A-B illustrate examples of display configurations for a multi-user system.
Figure 3B:
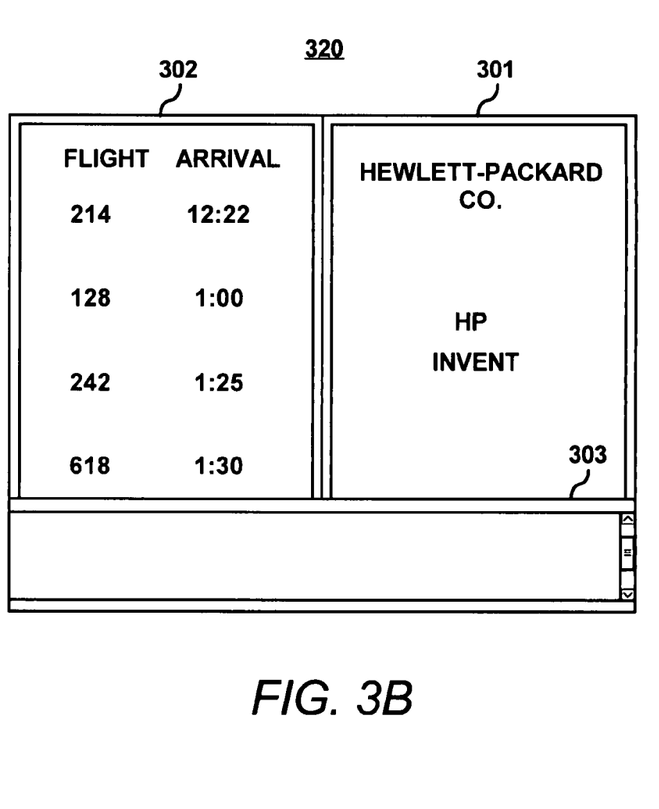

FIGS. 3A-B illustrate examples of different display configurations. In the examples shown in FIGS. 3A-B, the display 14 is a multi-user display operable to display information from a plurality of sources simultaneously. In FIG. 3A, the control engine 120 provides a display configuration 310 on the display 14 including windows 301-303. The window 301 includes information from the computer system 20d shown in FIG. 1, which may include an advertisement server connected to the DREC 10 via the Internet. The window 302 includes flight information from the computer system 20b, which may include a server connected to the DREC 10 via a LAN. The window 303 includes information from the computer system 20a shown in FIG. 1, such as a word processing document that a user desires to view and edit. The window 303 as shown in FIG. 3A overlays the windows 301 and 302. FIG. 3B illustrates another example of a display configuration provided by the control engine 120. The display configuration 320 shown in FIG. 3B also includes the windows 301-303. However, the size of the windows 301-303 is changed and the location of the window 303 is changed.

The control engine 120 may select the configuration 310 shown in FIG. 3A, because the user acceptance (i.e., a usage metric) of using the window 303 in the display configuration 310 is higher (e.g., larger window in the center of the display 14) than the user acceptance of the window 303 in the configuration 320 shown in FIG. 3B. Also, the windows 302 and 303 may be dimmed in the configuration 310, which may result in reduced power consumption and a lower impact on display lifetime. In addition, the source display settings 118 for the computer system 20a may require that the window 303 be displayed substantially in the center of the display 14. Alternatively, the control engine 120 may select the display configuration 320 shown in FIG. 3B, because the cost of using the display 14 to the user of the computer system 20a is lower than the cost if the display configuration 310 were implemented. The cost of using the display 14 for the display configuration 320 may be lower, because the window 303 shown in FIG. 3B is not as large and is located at the bottom of the display 14. Also, the display configuration 320 may be selected, because the source display settings 118 for the computer system 20a require that the lowest cost window be provided.

Figure 4A:
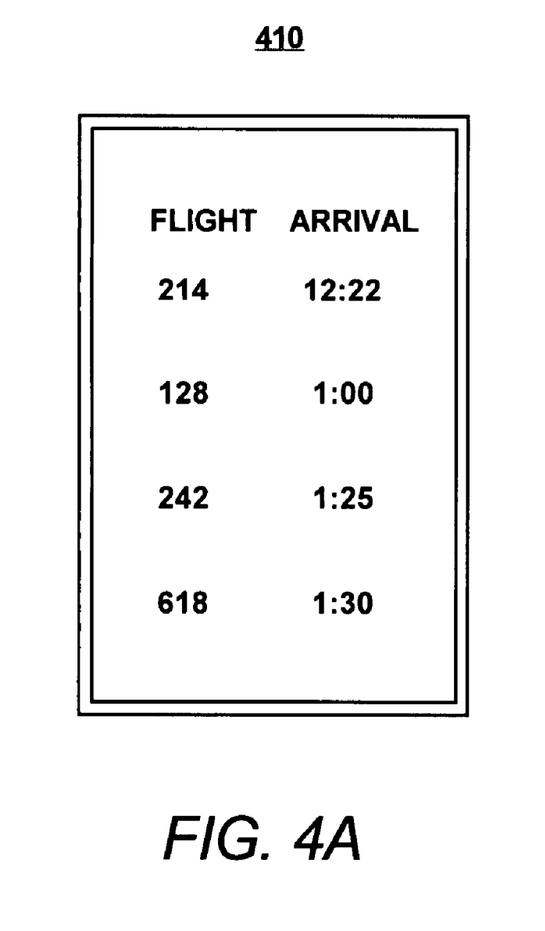
FIGS. 4A-B illustrate examples of display configurations for a single user system.
Figure 4B:
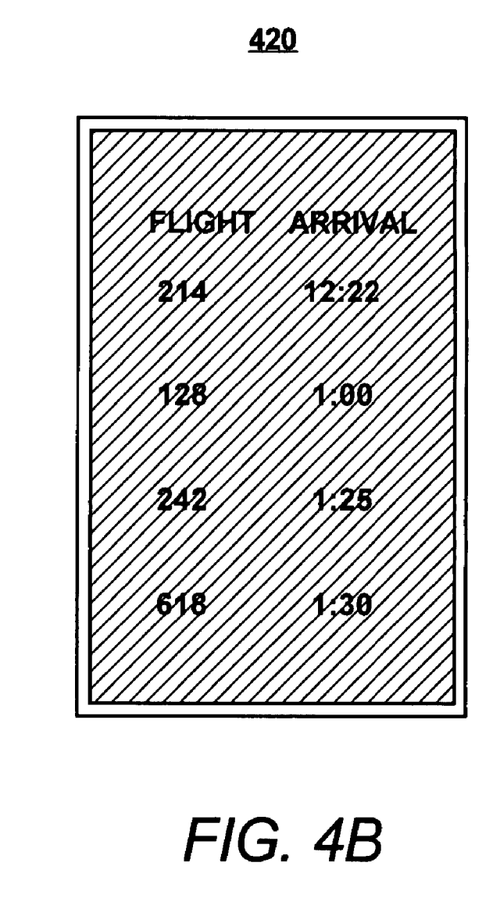

FIGS. 4A-B also illustrate examples of different display configurations. In the examples shown in FIGS. 4A-B, the display 14 is a single user display operable to display information from one source at a time. FIGS. 4A-B illustrate examples of display configurations 410 and 420 including flight information from the computer system 20b, which may include a server connected to the DREC 10 via a LAN. The configuration 420 shown in FIG. 4B includes a dimmed display. Also, the text may be displayed using green sub-pixels. The configuration 410 shown in FIG. 4A may not be dimmed and the text may be displayed using red sub-pixels. The control engine 120 may select the display configuration 410 during peak travel times and may select the configuration 420 during non-peak travel times because the display configuration 420 results in lower power consumption and lower impact on display lifetime.

Figure 5:
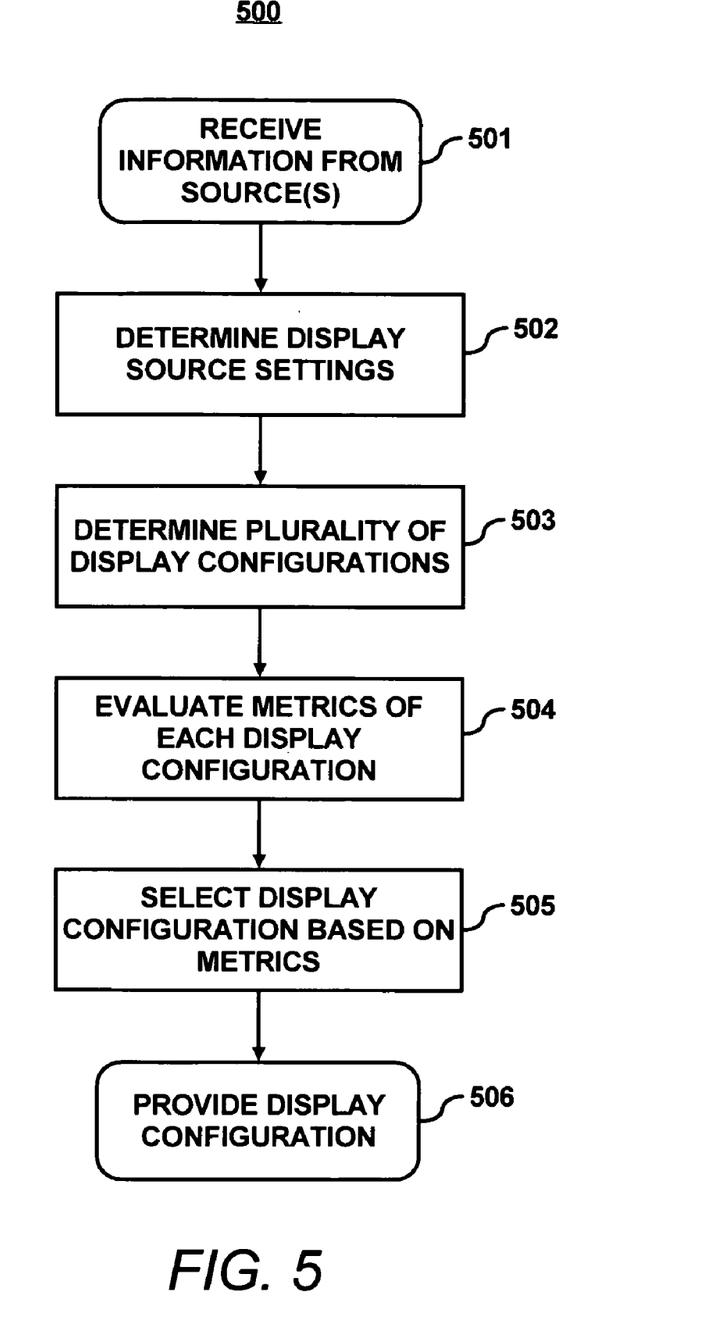
FIG. 5 illustrates a flow chart of a method for selecting a display configuration, according to an embodiment.

FIG. 5 illustrates a flow chart of a method 500 for selecting a display configuration. FIG. 5 is described with respect to the DREC 10 shown in FIGS. 1 and 2 by way of example and not limitation. At step 501, the DREC 10 receives information to be displayed on the display 14 from one or more sources, such as one or more of the computer systems 20.

At step 502, the control engine 120 shown in FIG. 2 determines the display source settings for the information received from the sources. The sources may optionally send the display source settings 118. Examples of the display source settings 118 may include displaying an image on the display 14 in one or more specified colors, size of the image, location of the image, etc.

At step 503, the control engine 120 determines a plurality of display configurations for displaying the information received from the sources. The control engine 120 may consider the source display settings 118 when determining the plurality of display configurations. The control engine 120 attempts to satisfy the source display settings 118 for each display configurations. For example, if one of the source display settings 118 includes a position on the display 14 for displaying the information from a source, then the control engine 120 attempts to include the information in the specified position for each display configuration. However, if another source display setting for the same source includes providing a lowest cost for using the display, then the control engine 120 may change the position of the information if it results in a lower display use cost for the source. Also, the control engine 120 may consider metrics, such as cost metrics, power consumption metrics, lifetime metrics, and usage metrics when determining the display configurations. For example, the control engine 120 may determine display configurations, such as the display configurations 310 and 320 shown in FIGS. 3A-B or the display configurations 410 and 420 shown in FIGS. 4A-B, because these display configurations have varying metrics.

At step 504, the metrics for each of the display configurations are evaluated, and at step 505 one of the display configurations is selected based on the evaluation of the metrics. In one example, the control engine 120 uses a weighting algorithm that weights the different metrics for each display configuration. The control engine 120 then ranks each display configuration and selects one of the highest ranked display configurations. Other algorithms may be used to evaluate the display configurations. For example, the display configurations may be ranked primarily based on cost metrics. The display configuration that generates the most revenue may be selected or the display revenue that results in the least operation costs may be selected. In another example, if the remaining life of the display 14 is below a threshold, then the display configuration that has the least impact on the lifetime of the display 14 may be selected by the control engine 120.

At step 506, the display computer system 12 implements the selected display configuration. Thus, the information from the sources is displayed on the display 14 using the selected display configuration. The method 500 may be used for a multi-user display configuration, such as shown in FIGS. 3A-B, or a single user display configuration, such as shown in FIGS. 4A-B. Also, it will be apparent to one of ordinary skill that various modifications may be made to the method 500 without departing from the spirit and scope of the embodiments. For example, each display configuration may be evaluated as it is determined, such that steps 503-504 are performed substantially simultaneously as each display configuration is determined.

Figure 6:
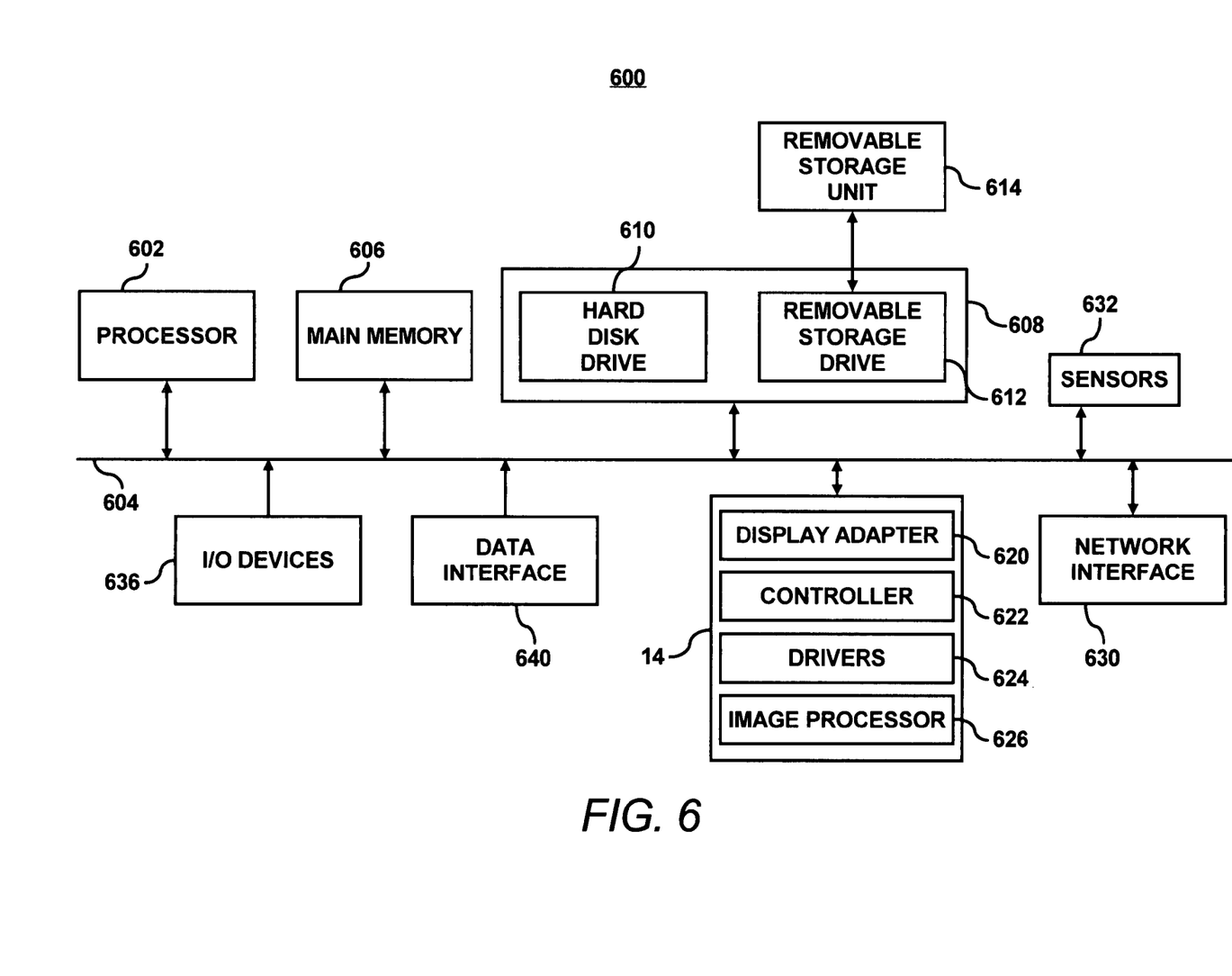
FIG. 6 illustrates a hardware block diagram of a computer system, according to an embodiment.

FIG. 6 illustrates a block diagram of a computer system 600, which may include the DREC 10 having the display 14 shown in FIG. 1. The computer system 600 includes one or more processors, such as processor 602, providing an execution platform for executing software that may embody one or more components of the DREC 10.

Commands and data from the processor 602 are communicated over a communication bus 605. The computer system 600 also includes a main memory 606, such as a random access memory (RAM), where software may be executed during runtime, and a secondary memory 608. The secondary memory 608 includes, for example, a hard disk drive 610 and/or a removable storage drive 612, representing a SIM or memory card, a floppy diskette drive, a magnetic tape drive, a compact disk drive, etc., or a nonvolatile memory where a copy of the software may be stored. The secondary memory 608 may also include ROM (read only memory), EPROM (erasable, programmable ROM), and/or an EEPROM (electrically erasable, programmable ROM). The removable storage drive 612 reads from and/or writes to a removable storage unit 615 in a well-known manner.

A user interfaces with the DREC 10 with one or more I/O devices 636, such as a keyboard, a mouse, a stylus, speech or hand-writing recognition interfaces, etc. The I/O devices 636 are optional or may be made available only to system administrators for maintenance. The display 14 may include a display subsystem including any combination of the hardware and software modules associated with the visual representation of data for the computer systems 20. For example, the display 14 may include a display controller 622, a display panel 620, display drivers 624 corresponding to the display panel technology and an image processing module 626. The image processing module 626 may provide geometry and raster processing. The display 14 may be controlled, in part, by controlling its parameters using the display controller 622.

Depending on it features, the display parameters 414 can include intensity, color, refresh rate, gray-scale, ambient illumination, contrast, array size, number of tiles and the like, or any combination thereof, and may be related to the display configurations. Software including one or more of the steps of the method 500 shown in FIG. 5 may provide the necessary instructions to allow the processor 602 to control the display parameters. For example, the processor 602 may instruct the display controller 622 to control the display parameters. Also, the software may be implemented at any layer of a system, including an operating system, windowing environment (if applicable), applications or firmware (not specifically shown), and may communicate with an application to control movement of an image if needed to implement a display control option.

A network interface 630 is provided for communicating with the computer systems 20 via the network 40 shown in FIG. 1. Also, a data interface 640, such as a USB port, serial port, infra-red or radio frequency interface, etc., is provided for receiving information from any of the computer systems 20 without the use of the network 40. Sensors 632 are provided for measuring usage data, power consumption data and lifetime data for the display 14. The sensors 632 may be embodied in software, hardware or a combination thereof.

One or more of the steps of the method 500 may be implemented as software embedded on a computer readable medium, such as the memory 606 and/or 608, and executed by the DREC 10. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form.

Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:

a computer system determining a plurality of display configurations for displaying information from at least one source, wherein each display configuration includes a plurality of windows, and an appearance or location of at least one of the windows is varied per display configuration to cause at least one of a plurality of metrics to vary per display configuration, wherein the plurality of metrics include a usage metric, a power consumption metric, a lifetime metric, and a monetary cost metric;

for each display configuration, determining the plurality of metrics;

evaluating each of the display configurations based on the plurality of metrics for each display configuration; and selecting one of the plurality of display configurations based on the evaluation.

2. The method of claim 1, further comprising:
determining the usage metric using a usage model, wherein the usage model includes an analysis of usage patterns for a display.

3. The method of claim 1, further comprising:
determining the power consumption metric using a power consumption model, wherein the power consumption model includes an analysis of power consumption data for a display.

4. The method of claim 1, further comprising:
determining the lifetime metric using a lifetime model, wherein the lifetime model includes an analysis of lifetime data for a display.

5. The method of claim 1, further comprising:
determining the cost metric using a cost model, wherein the cost model includes an analysis of predetermined factors associated with using the display and a relation of the factors to monetary costs.

6. The method of claim 1, wherein evaluating each of the configurations comprises:
using an algorithm weighting the plurality of metrics to evaluate each of the configurations.

7. The method of claim 1, wherein evaluating each of the configurations comprises:
evaluating each of the configurations based on source display settings received from the at least one source.

8. The method of claim 1, further comprising:
generating the display configuration on a display.

9. The method of claim 8, wherein the at least one source comprises a plurality of users and each window of each display configuration is associated with a different one of the plurality of users.

10. The method of claim 9, wherein the step of determining a cost metric associated with displaying information from at least one source comprises determining a cost metric for each of the plurality of windows.

11. The method of claim 1, wherein the cost metric is associated with at least one of a cost of using a display and display operating costs for displaying the information from the at least one source.

12. The method of claim 1, wherein the display configuration comprises a visual representation of the information from the at least one source provided on a display.

13. A method of displaying information on a display, the method comprising:
a computer system determining a plurality of display configurations for displaying information from a plurality of users, wherein each display configuration includes a plurality of windows and each window displays information for a different user, and an appearance or location of at least one of the windows is varied per display configuration to cause at least one of a plurality of metrics to vary per display configuration, wherein the plurality of metrics include a usage metric, a power consumption metric, a lifetime metric, and a monetary cost metric;

determining the plurality of metrics for each display configuration;

evaluating each of the display configurations based on the plurality of metrics;

selecting one of the plurality of display configurations based on the evaluation; and providing the display configuration on the display.

14. The method of claim 13,
wherein the cost metric is related to one of operational costs and cost of using the display.

15. The method of claim 13, wherein evaluating each of the display configurations comprises:
ranking each of the display configurations based on an algorithm weighting the plurality of metrics for each of the display configurations.

16. The method of claim 13, wherein each display configuration comprises a visual representation of the information from the user provided on the display.

17. An apparatus comprising:
means for receiving information from a plurality of users;
means for determining a plurality of display configurations for displaying information from the plurality of users, wherein each display configuration includes a plurality of windows and each window displays information for a different user, and an appearance or location of at least one of the windows is varied per display configuration to cause at least one of a plurality of metrics to vary per display configuration, wherein the plurality of metrics include a usage metric, a power consumption metric, a lifetime metric, and a monetary cost metric;
means for determining the plurality of metrics for each display configuration; and
means for selecting one of the plurality of display configurations based on the plurality of metrics determined for each display configuration.

18. The apparatus of claim 17, further comprising:
means for displaying the information from the at least one source in the selected display configuration.

19. The apparatus of claim 17, further comprising:
means for evaluating each of the display configurations using the plurality of metrics.

20. Computer software embedded on a non-transitory computer readable medium, the computer software comprising instructions of:

determining a plurality of display configurations for displaying information from at least one source, wherein each display configuration includes a plurality of windows, and an appearance or location of at least one of the windows is varied per display configuration to cause at least one of a plurality of metrics to vary per display configuration, wherein the plurality of metrics include a usage metric, a power consumption metric, a lifetime metric, and a monetary cost metric;

for each display configuration, determining the plurality of metrics;

evaluating each of the display configurations based on the plurality of metrics for each display configuration; and selecting one of the plurality of display configurations based on the evaluation.

21. A computing system comprising:

at least one interface operable to receive information from a plurality of users;

a processor operable to determine a plurality of display configurations for displaying the information, wherein each display configuration includes a plurality of windows and each window displays information for a different user, and an appearance or location of at least one of the windows is varied per display configuration to cause at least one of a plurality of metrics to vary per display configuration, wherein the plurality of metrics include a usage metric, a power consumption metric, a lifetime metric, and a monetary cost metric, evaluate each of the display configurations based on the plurality of metrics for each display configuration, and select a display configuration from the plurality of display configurations based on the evaluation of each of the display configurations; and a display operable to display the selected display configuration of the information, the display configuration being a visual representation of the information on the display.

* * * * *